July 21, 1959 — H. WURZEL — 2,895,754
CONNECTORS
Filed Dec. 14, 1954 — 2 Sheets-Sheet 1

INVENTOR.
HUGO WURZEL
BY
J. Harold Kilcoyne
ATTORNEY

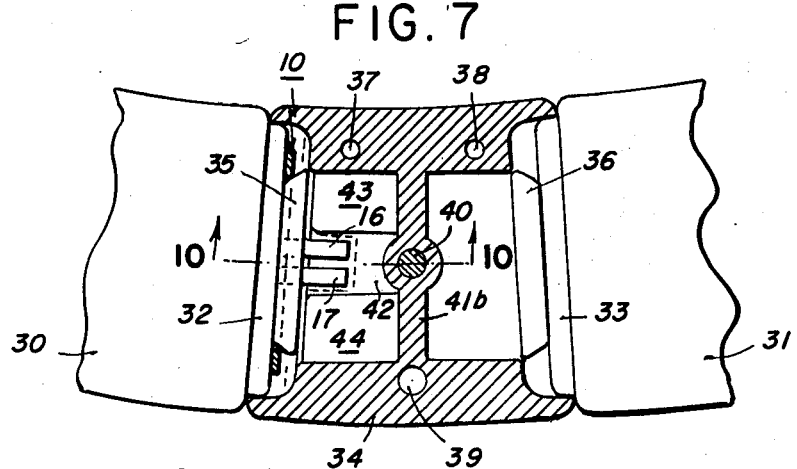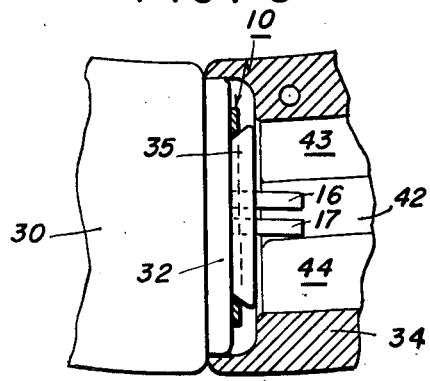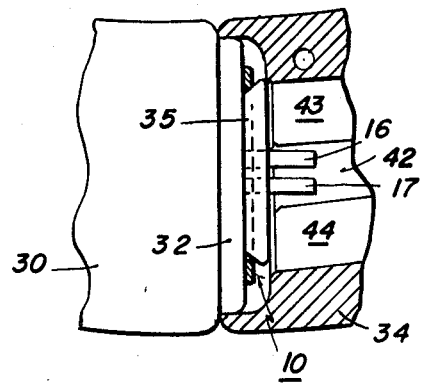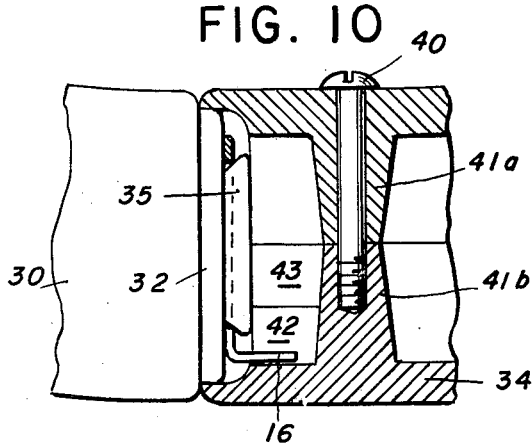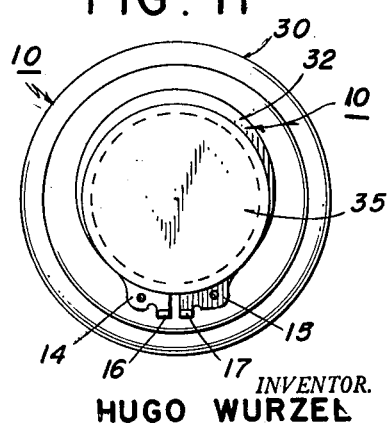

United States Patent Office 2,895,754
Patented July 21, 1959

2,895,754
CONNECTORS
Hugo Wurzel, Bronx, N.Y., assignor to Waldes Kohinoor, Inc., Long Island City, N.Y., a corporation of New York Application December 14, 1954, Serial No. 475,047
8 Claims. (Cl. 287—53)

This invention relates to improvements in connectors and in connected assemblies employing same as the connecting means therein, and more particularly to an improved retaining-ring type of connector for preventing unwanted turning movement between the usually cylindrical parts of an assembly comprising, for example, the cylindrical end or ends of a ring-shaped fluorescent lamp and the socket or sleeve containing the wiring therefor, or a machine part and its carrying member, and to the connected assembly of such parts.

An object of the invention is the provision of a retaining-ring type of connector for parts likely to partake of unwanted turning movement relatively of one another, and which is so constructed and arranged as effectively to prevent same.

Another object of the invention is the provision of connector as aforesaid which is simple as to manufacture and assembly and thoroughly dependable in operation.

A more particular object of the invention is the provision of a connector effective to prevent unwanted turning movement between associated parts of an assembly, which is characterized by a body portion constructed and functioning as an open-ended retaining ring, whereby it is capable of assembly on or with one part by being sprung into a groove provided in said part, and by one or more prongs bent out of the plane of said ring body so as to extend laterally therefrom, said prong or prongs being thereby capable of entering a recess provided therefor in another part of the assembly and of keying said parts together and against relative rotation, while at the same time locking the ring against rotation in its groove.

A further object of the invention is the provision of novel connected assemblies of parts made possible by the use of a retaining-ring type of connector of the last stated character as the parts-connecting means.

The above and other objects and advantages of a connector and of the connected assemblies employing same as the connecting means, as herein proposed, will be clear from the following detailed description thereof, reference being had to the accompanying drawings illustrative of same, wherein Fig. 1 is a front plan view of a retaining-ring type of connector for the parts of an assembly desired to be locked or keyed against rotation;

Figure 1:
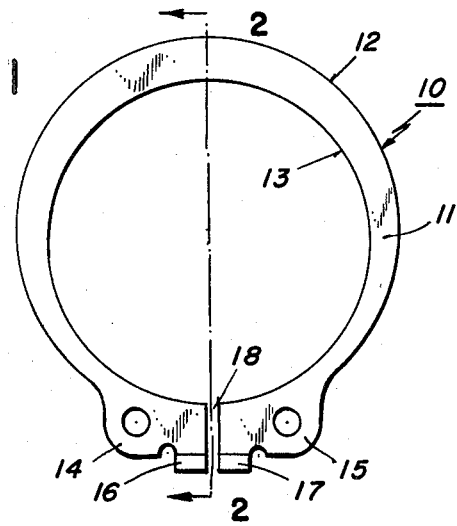
Figure 2:
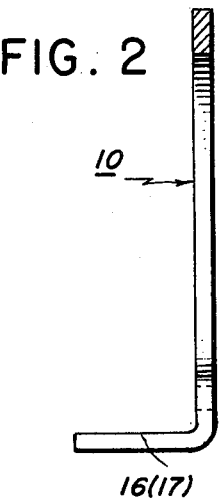
Fig. 2 is a section taken on line 2—2 of Fig. 1.
Figure 3:
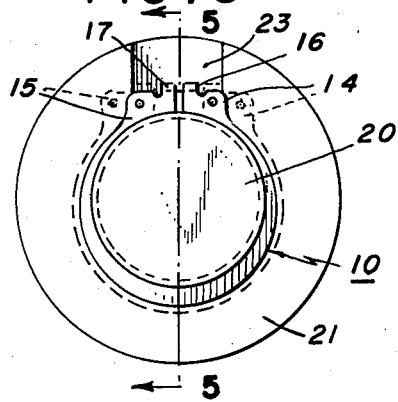
Figs. 3 and 4 are plan views, respectively, of one partial and completed connected assembly of parts employing a retaining-ring type of connector generally as illustrated in Figs. 1 and 2 as the parts-connecting means, as herein proposed.
Figure 4:
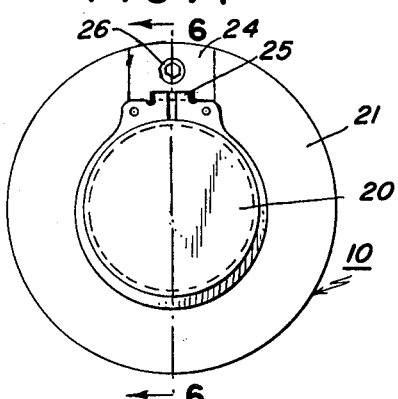
Figure 5:
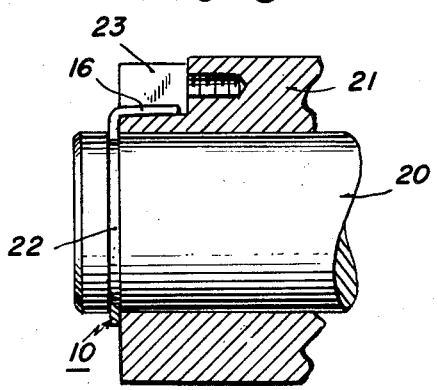
Figure 6:
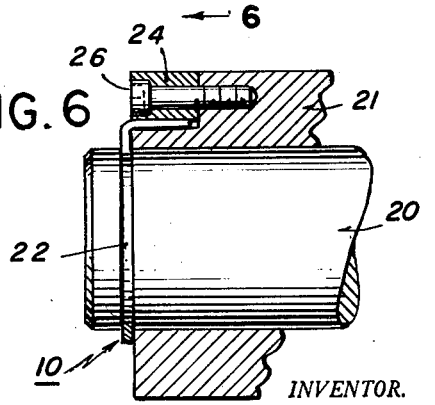

Figs. 5 and 6 are sectional views taken along lines 5—5 and 6—6 of Figs. 3 and 4, respectively;

Fig. 7 is a broken-away plan view in part section of another form of assembly made possible by the use of a retaining-ring type of connector as shown in Figs. 1 and 2;

Figs. 8 and 9 are partial views illustrating the action of the Fig. 1 connector as employed in the Fig. 7 form of assembly in preventing turning of the parts making up the same in either direction;

Fig. 10 is a section taken on line 10—10 of Fig. 7; and

Fig. 11 is an end view of one of the parts of the Fig. 7 form of assembly, with connector applied thereto but with the other part of the assembly not shown.

Referring to the drawings, reference numeral 10 (Figs. 1 and 2) generally indicates a connector according to the invention for keying or locking the usually cylindrical parts of certain forms of assemblies against relative rotation. Illustratively, such a connector comprises a body portion 11 having the form of an open-ended or split external retaining ring made of spring steel. Preferably, the outer edge 12 of the ring body is eccentric to its inner edge 13, and this eccentricity is such that the section height (radial width) of the ring body decreases progressively from its middle section towards its free ends, whereby it deforms circularly during and when fully assembled in its groove, as is necessary for its inner edge to seat all around against and grip tight to the bottom of the groove in which it is conventionally assembled with sufficient pressure as to prevent the ring turning in the groove. At its free ends, the ring body may be and preferably is provided with radial-outward lugs or ears 14, 15, which are apertured for the reception of the tips of pliers by which the ring body may be spread in assembly and disassembly.

According to the invention, such a ring body is provided with locking or key-forming prongs 16, 17 which, as seen in Fig. 2, extend at a right angle from the plane of said body. By reference to Fig. 1, said prongs are illustratively shown to be located to the sides of the ring gap 18 and between said gap and the apertures of the end lugs 14, 15. It will be understood that locking prongs 16, 17 as aforesaid may be provided on the ring body during its manufacture, as by stamping the ring body and prongs as a single blank, followed by bending of the prongs to their right angular disposition shown in Fig. 2.

A retaining-ring type of connection as aforesaid may be used to good advantage in an assembly of the kind illustrated in Figs. 3–6, wherein it functions both to secure a machine part mounted on a carrying member against axial displacement with respect to said member, and also to lock said parts against relative turning movement. In such an assembly, reference numeral 20 designates a carrying member such as a shaft, and 21 the machine part mounted thereon. Said carrier is provided with a circumferential groove 22, into which the ring body 11 of the connector 10 is sprung whereby, similarly to a conventional retaining ring, it forms an artificial shoulder against which the machine part 21 abuts so as to be located and secured against axial displacement in one direction thereby.

As best seen in Figs. 3 and 5, said machine part 21 is formed with a recess 23 which opens through both its end face which abuts the ring body 10 and its outer periphery. The bottom of the recess is disposed at the level of the under faces of the locking prongs 16, 17 of the connector 10, and its width is preferably such as to accommodate said prongs when the ring body 11 is fully spread during ring assembly or disassembly, as indicated by the broken lines in Fig. 3. Accordingly, the prongs 16, 17 may be inserted in the recess 23 during the final portion of the assembly movement of the connector body 11 over the carrying member 21, and upon the assembly operation being completed, the ring body contracts in the groove 22 and the prongs 16, 17 engage against the bottom wall of the recess 23 with sufficient tightness as to prevent any substantial relative turning of said parts. Of course, with nothing more, there will be some end play between the sides of the prongs 16, 17 and the side walls of said recess, since the width of the recess is greater than the combined width of the prongs, plus any spacing therebetween as results from ring assembly. If desirable or necessary to eliminate this side play, an insert 24 shaped and dimensioned to fit the recess 23 and having in its under surface a cut-out 25 for the reception of the prongs is provided. Said insert may be slipped in place in the recess, thereby to close same and prevent any relative lateral movement or play whatsoever between the prongs and the machine part 21. Moreover, the insert may be locked to said machine part against accidental separation therefrom as by a set screw 26.

Another type of connected assembly made possible by the connector 10 as aforesaid is illustrated in Figs. 7–11. In said views, reference numerals 30, 31 designate the spaced cylindrical ends of a curved (ring-shaped) fluorescent lamp, said ends terminating in short length, reduced diameter cylindrical shoulders 32, 33 for the sleeve or socket 34 which contains the electrical wiring for the lamp. On the end faces of said shoulder portions are formed circular protrusions or buttons 35, 36, whose peripheral surfaces are sloped inwardly towards said end faces, such sloping in effect forming annular V-grooves on the end faces of the ring-shaped lamp.

The aforesaid sleeve or socket 34 is shown to have apertures 37, 38 and 39 for the wiring aforesaid, and if made of two semi-cylindrical parts as shown, it will be provided with means for securing said parts in full cylindrical formation, such as the cross bolt 40 (Fig. 10) which extends into and connects the cross partitions 41a, 41b in the sleeve bore. The interior wall defining at least one end of the bore of sleeve 34 may be formed with an axial recess 42 as defined by adjacent ribs 43, 44 which extend radially inwardly from said interior wall. As best seen in Figs. 7 and 10, said recess opens through said one end of the sleeve, illustratively the left end.

According to the invention, the V-groove on the end face of the lamp end 30 is employed to mount on and secure to said lamp end a connector 10 as described, the ring body 11 thereof spring-seating itself against the inclined groove bottom and being wedged thereby against said end face. This positioning of the ring body of course provides for the locking prongs 16, 17 extending laterally from the lamp end into the sleeve end which receives said lamp end. By a proper angular disposition of ring body in its groove as aforesaid, the locking prongs 16, 17 project into the recess 42 and bear against the bottom wall thereof (see Fig. 10) with sufficient tightness as to secure the sleeve against any substantial turning movement relative to the ring. Additionally, said prongs act as a key which prevents relative turning between lamp end and sleeve. For example, if the lamp end tends to turn to the right (clockwise) with respect to the sleeve 34, a prong 17 will bear against a rib 44, as in Fig. 8, and prevent same from taking place. Conversely, when the lamp end tends to turn to the left, a prong 16 will bear against the opposite rib 43 (Fig. 9) thereby to prevent such movement. It will be further understood that engagement of either prong against its corresponding rib results in the ring body pressing more tightly against the bottom of its groove, thereby in effect frictionally locking the ring body and hence the connector 10 as a whole against turning in its groove.

Without further analysis, it will be seen that the invention achieves in simple yet highly effective manner various practical forms of a connected assembly of parts characterized by a retaining-ring type of connector between the main parts making up the assembly. Such a connector is simple both in manufacture and assembly, since it can be fabricated by the same techniques employed in retaining ring manufacture, and its assembly substantially follows that employed in assembling conventional external retaining rings. In addition, a connector according to the present invention is flexible in its application; that is to say, it may be employed in assemblies requiring it to function as an artificial shoulder as well as a connector, or it may be used equally effectively in assemblies wherein it is required to function solely as a connector.

As many changes could be made in carrying out the above constructions without departing from the scope of the invention, it is intended that all matter contained in the above description or shown in the accompanying drawings shall be interpreted as illustrative and not in a limiting sense.

I claim:

1. A connected assembly comprising a cylindrical ring mounting member, an annular machine part associated with said member, said member having a circumferential groove with which a face of said machine part is generally radially aligned, said machine part having a recess therein which opens through said face, and a connector comprising an open-ended ring body made of spring material seated with spring pressure against the bottom of said groove, and laterally spaced, inwardly biased prongs integral with and extending from said ring-ends at an angle to said ring body into said recess and being disposed intermediate the side walls of the latter, the width of said recess being slightly greater than the combined width of said prongs plus the spacing between them when said prongs are so arranged whereby to permit intentional limited relative lateral expansive movement of said prongs therein.

2. A connected assembly as set forth in claim 1, wherein said ring body has progressively decreasing section height from its middle section to near its free ends.

3. A connected assembly as set forth in claim 1, wherein a removable insert filling said recess and affixed to said machine part is provided, said insert being operative to take up any side play between said prongs and the side walls of the recess.

4. A connected assembly comprising generally cylindrical members and a connector extending between said members and being operative to prevent relative turning movement therebetween, one of said members having an outwardly opening, circumferential groove, the other member having a recess defined in part by bottom and side walls, the connector comprising an open-ended ring body of spring material seating with spring pressure against the bottom of said groove and being provided at its ends with angularly disposed, laterally spaced inwardly biased locking prongs which extend into and are spaced from the side walls of said recess and engage against the bottom wall thereof with sufficient tightness as to substantially prevent relative movement of said parts, said prongs being also positioned in said recess as to be abutted by the recess side walls responsively to any substantial relative turning of said parts, said recess being wider than the combined width of said prongs, plus the spacing between them when said prongs are so arranged, whereby to permit intentional limited relative lateral expansive movement of the prongs therein.

5. A connected assembly as set forth in claim 4, wherein said ring body forms an artificial shoulder on said one member which is abutted by said other member and thereby serves to prevent axial displacement of said other member.

6. A connected assembly comprising a cylindrical part having a shoulder end and an end face provided with an annular, outwardly opening groove, a sleeve part receiving said shoulder end and enclosing said end face and groove, the interior wall surface of said sleeve part being provided with an axial recess which opens through an end edge thereof, and a connector extending between said parts and locking them against relative turning comprising an open-ended ring body seating in said groove and terminating at its open ends in apertured lug-like formations and being provided at said ends with two right-angularly disposed, laterally spaced prongs which extend into said recess and key said parts together, said ring body having pressure fit against the groove bottom whereby the prongs are biased towards one another and said recess having width greater than the combined width of said prongs, plus the spacing between them when the prongs are arranged as aforesaid.

7. A connected assembly as set forth in claim 6, wherein the ring body has progressively decreasing section height from its middle section to near its open ends.

8. A connected assembly as set forth in claim 6, wherein the end-face groove is formed by a circular button-like projection thereon and said groove has V-section as defined by said end face and a groove bottom which is inclined inwardly to said end face.

References Cited in the file of this patent

UNITED STATES PATENTS

| | | |
|---|---|---|
| 2,082,315 | Williams | June 1, 1937 |
| 2,544,631 | Heimann | Mar. 6, 1951 |
| 2,580,396 | Bluth | Jan. 1, 1952 |
| 2,615,735 | Heimann | Oct. 28, 1952 |

FOREIGN PATENTS

| | | |
|---|---|---|
| 889,388 | Germany | Sept. 10, 1953 |